April 8, 1930.  J. R. REPLOGLE  1,753,946
LID FOR REFRIGERATING CABINETS
Filed Aug. 25, 1927  2 Sheets-Sheet 1
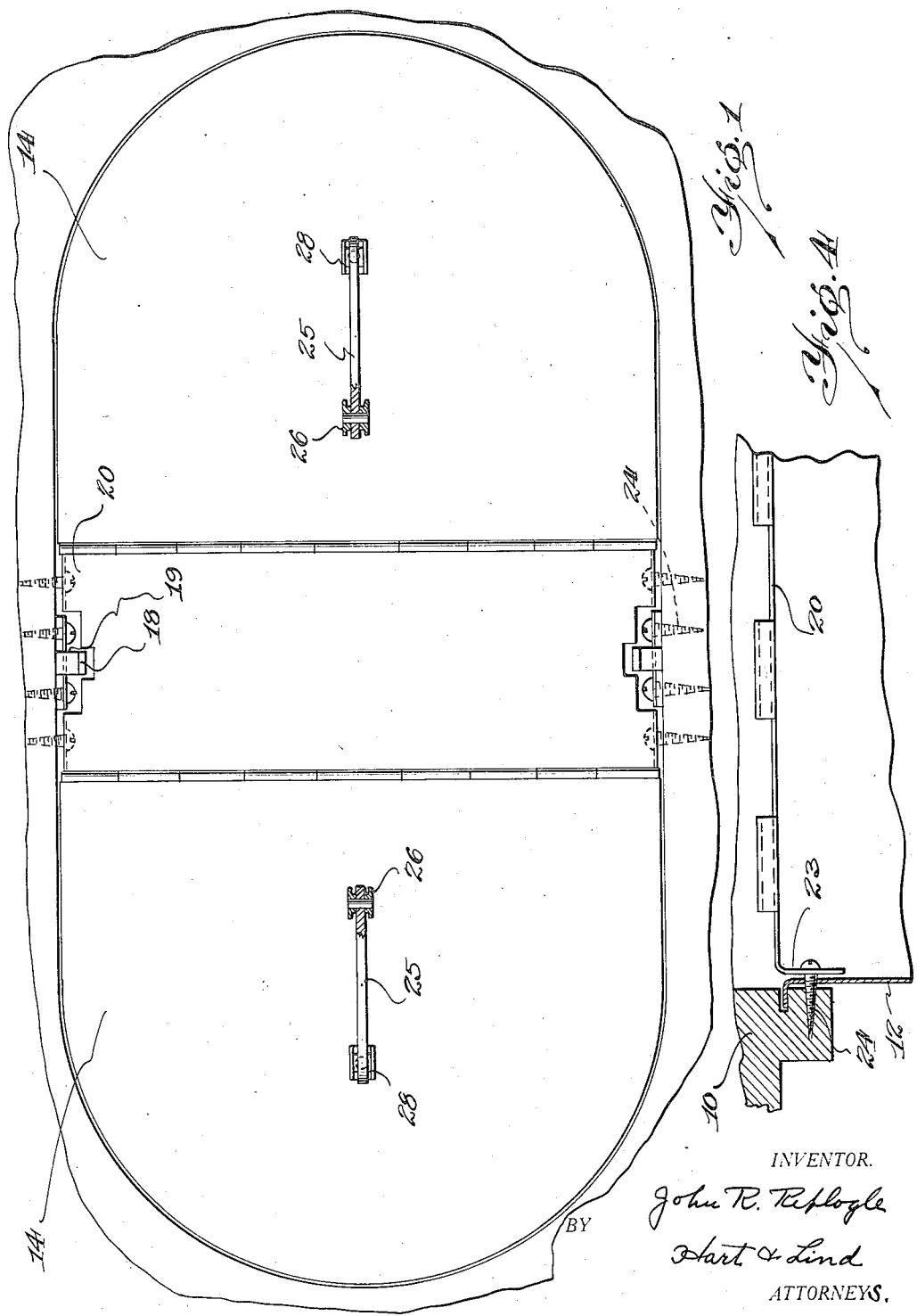
INVENTOR.
John R. Replogle
BY Hart & Lind
ATTORNEYS.

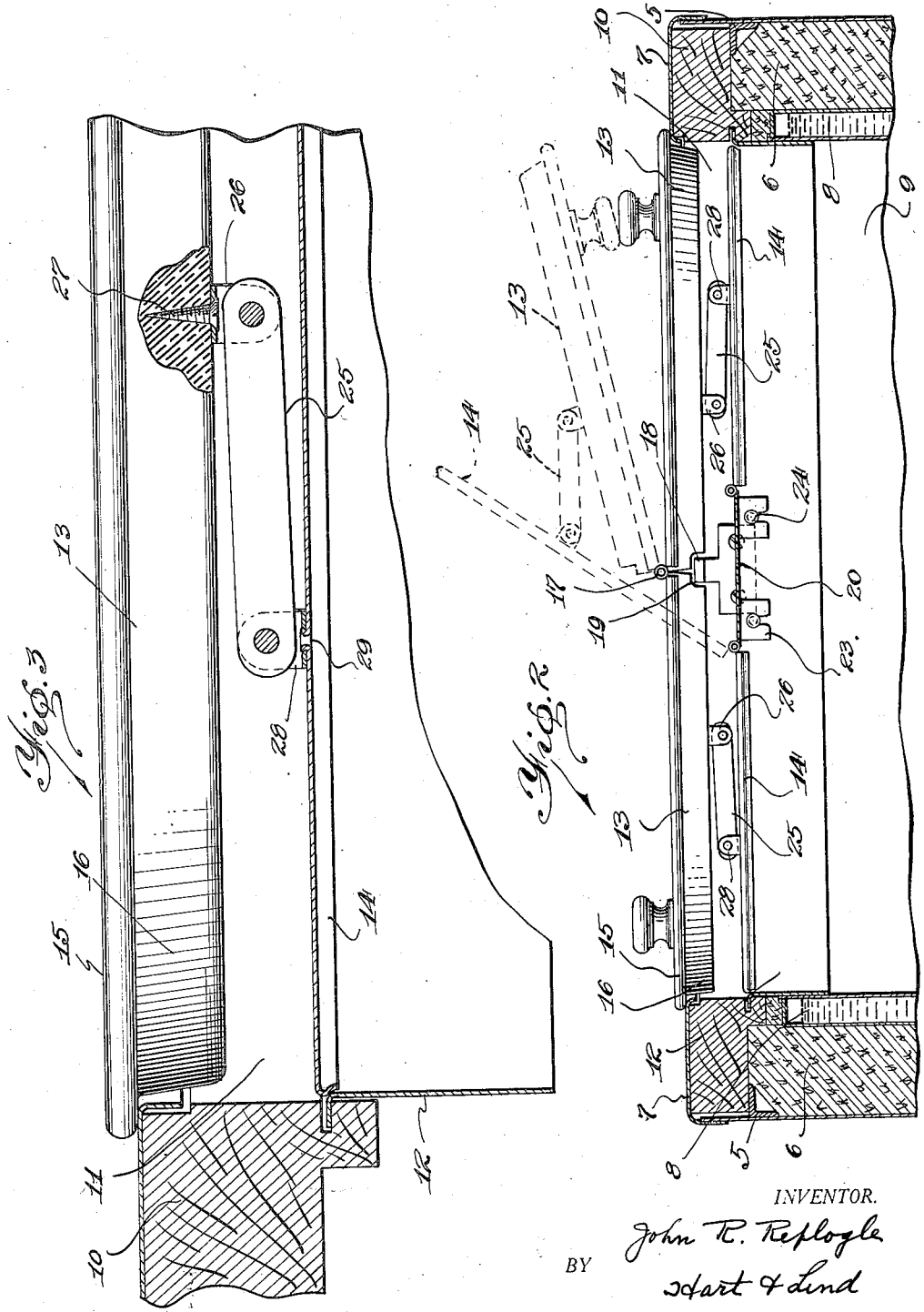

Patented Apr. 8, 1930

1,753,946

UNITED STATES PATENT OFFICE

JOHN R. REPLOGLE, OF DETROIT, MICHIGAN, ASSIGNOR TO KELVINATOR CORPORATION, OF DETROIT, MICHIGAN, A CORPORATION OF MICHIGAN

LID FOR REFRIGERATING CABINETS

Application filed August 25, 1927. Serial No. 215,311.

My invention relates to refrigerated food storage cabinets and more particularly to a cover structure for such cabinets.

It is customary to provide the present type refrigerated food storage cabinets with a removable heat insulating lid for closing an opening through the top wall of the cabinet through which access is had to the food compartment. This lid, when removed and reseated, traps warm air in the space under it, thereby raising the temperature of the open top portion of the interior of the food compartment. Further, distortion of the lid or its seat also prevents proper seating which allows the warm air to leak into the food compartment of the cabinet which will raise the temperature therein. Attempts have been made to overcome these difficulties by the provision of a separately removable lid in thermal contact with the open end of the food compartment. This arrangement is successful but is not utilized by the cabinet user because of the loss of time and the extra work required in raising the lids separately in order to obtain access to the food compartment.

An object of my invention is to provide a cover structure, which is formed as a unit and can be raised by a single movement, for closing an opening in the top wall of a refrigerated food storage cabinet and an open food storage chamber, through which openings access is had to the food compartment.

Another object of my invention is to provide a double cover structure formed of hinged sections, each of which include a cover for the cabinet and a cover for the food storage chamber within the cabinet, either section of which can be raised without disturbing the other, to permit access to different parts of the food storage chamber.

Another object of my invention is to provide a unitary cover structure which includes an insulated lid for closing an opening in the cabinet wall and a lid for thermally closing an opening in the food storage chamber, which lids are connected so that they may be raised by a single movement to obtain access to the food compartment.

Other objects of my invention more or less incidental or ancillary to the foregoing will appear in the following description which sets forth, in connection with the drawings accompanying and forming a part of this specification, a preferred embodiment of the invention.

In the drawings:

Figure 1 is a fragmentary top plan view of a food storage cabinet incorporating the cover structure forming the subject of my invention.

Figure 2 is a fragmentary cross sectional view of a food storage cabinet showing the application of the cover construction, one of the lid sections being shown in a raised position, in dotted lines.

Figure 3 is a fragmentary view of the cover structure partially in section, showing the means for connecting the primary and secondary cover sections.

Figure 4 is a fragmentary sectional view showing the hinge sockets formed upon the secondary cover section and the means for holding the cover section in place.

Referring to the drawing by characters of reference, the drawings illustrate a conventional form of food storage cabinet, which consists of an angle iron frame 5 supporting heat insulated walls 6 and covered by a metallic casing 7. The walls 6 define a space for receiving a tank 8 adapted to contain brine which is cooled by suitable mechanical cooling means. A sleeve 9, open at the top to permit storage of food therein, extends into the brine tank 8 and is sealed thereto in a liquid-tight relation.

The cabinet is provided with a top closure wall 10 of the usual wooden metal-covered construction. This top wall extends entirely across the lateral walls of the cabinet, and is provided with an opening 11, in alignment with the open top of the sleeve forming the food compartment, by which access is had to the food compartment. Depending from and fastened to the periphery of the opening 11, is a thimble 12 which enters and engages the wall of the food compartment 9, in a thermal relation. The thimble is formed of resilient sheet metal bent into cylindrical form. The upper edge of the thimble is out-turned to form a flange which enters a groove formed in the periphery of the opening. The ends of the thimble are held in place by screws extending into the top wall. The thimble 12 also closes the interior of the cabinet off from the exterior air and forms a continuous passageway into the food compartment.

With the opening 11 in the top wall 10 and the sleeve food compartment 9, I propose to associate a double cover structure to close the opening 11 and the top of the food compartment. The double cover structure consists of similar primary cover members 13 and similar secondary members 14, so connected that both cover members may be raised at the same time by a single movement.

The primary cover members are provided for the purpose of seating in and closing the opening in the top wall of the cabinet. These primary cover members 13 are constructed with the usual metallic top portion 15 and an insulating lower portion 16 formed of such shape and size as to fit in the top wall opening 11. A hinge connection 17, between the primary members, is formed by bending the metallic top plate 15 of the cover portions 13 into matching hinge sockets connected by a pintle. Lateral displacement of the primary cover members is prevented by a stop member 18 secured to the top wall and projecting into notches 19 formed in the corners of the adjacent edges of the primary cover members.

The secondary cover members close the open top of the food compartment and seat against the thimble, forming a thermal contact therewith. These secondary cover members 14 are formed into two similar cover sections and a central stationary section 20, all of which are made from sheet metal. A hinge connection 21 is provided for the cover and central sections by bending the adjacent edges into matched hinge sockets 22 joined by a pintle. Lateral displacement of the secondary cover is prevented by the ears 23, which are integral with and bent at right angles to the central section. The ears 23 are slotted to pass over the shanks of the screws 24 which fasten the thimble 12 to the top wall and hold the ears in place.

The primary and secondary cover members are connected by a linking connecting means to provide a double lid structure that may be raised by one movement. A link 25 is attached at one end to the primary cover portion 13 by an ear 26 which is fastened to the cover member by a screw. The other end of the link 25 is attached to the secondary cover member 14 by an ear 28, similar to the ear 26, and is fastened to the cover member by turning over the edges of an aperture 29 punched through the secondary cover member 14.

It will thus be seen that I have provided a double cover construction for refrigerated food storage cabinets in which the two cover members are so connected that only one movement is required to raise the cover and permit access to the food compartment. The provision of a heat insulating primary cover structure and a heat conducting secondary cover secures complete sealing of the cabinet against heat leakage around the edges of the cover since any warmer exterior air leaking into the cabinet around the edges of the primary cover member is prevented from obtaining access to the upper portions of the food stored within the food compartments by the secondary cover member. This secondary cover member is formed of a heat conducting material and is positioned in a thermal relation with the thimble, which is in thermal contact with the food compartment, thus cooling any warm air trapped between the covers. A complete thermal circuit is thereby provided which not only prevents access of the warmer exterior air to the food compartments when the covers are in place but also cools the warm air admitted directly into the food compartment and trapped between the two cover members.

It will be seen that although I have illustrated only a preferred embodiment of my invention and described in detail only one application thereof, it will be obvious to anyone skilled in the art that various modifications and changes may be made therein without departing from the spirit thereof or from the scope of the appended claim.

What I claim is:

In a refrigerated food storage cabinet having an exterior wall and an interior food storage chamber each of which is provided with an opening to permit access to the interior of the food chamber, a cover structure comprising a primary cover for the opening through the exterior wall, a secondary cover for the opening in the food compartment, said primary and secondary covers being hinged to the exterior wall and interior food storage chamber respectively, and a link pivotally connected to both the primary and secondary covers whereby both covers move in unison in the same direction.

In testimony whereof I hereunto affix my signature.

JOHN R. REPLOGLE.